(12) United States Patent
Bronevetsky et al.

(10) Patent No.: US 12,516,930 B2
(45) Date of Patent: *Jan. 6, 2026

(54) PREDICTING GEOSPATIAL MEASURES

(71) Applicant: Deere & Co, Moline, IL (US)

(72) Inventors: Grigory Bronevetsky, San Ramon, CA (US); Charlotte Leroy, Redwood City, CA (US); Bin Ni, Fremont, CA (US); Hongxu Ma, Mountain View, CA (US); Gengchen Mai, Santa Barbara, CA (US)

(73) Assignee: Deere & Company, Moline, IL (US)

( * ) Notice: Subject to any disclaimer, the term of this patent is extended or adjusted under 35 U.S.C. 154(b) by 1000 days.

This patent is subject to a terminal disclaimer.

(21) Appl. No.: 17/200,023

(22) Filed: Mar. 12, 2021

(65) Prior Publication Data

US 2022/0290989 A1 Sep. 15, 2022

(51) Int. Cl.
*G01C 15/00* (2006.01)
*G01C 13/00* (2006.01)
*G06N 3/044* (2023.01)

(52) U.S. Cl.
CPC .......... *G01C 15/00* (2013.01); *G01C 13/00* (2013.01); *G06N 3/044* (2023.01)

(58) Field of Classification Search
CPC ......... G01C 15/00; G01C 13/00; G06N 3/044
See application file for complete search history.

(56) References Cited

U.S. PATENT DOCUMENTS

| 10,120,093 | B2 | 11/2018 | Le Calvez | |
| 10,303,841 | B1* | 5/2019 | Ochoa | G06F 16/29 |
| 2011/0257944 | A1* | 10/2011 | Du | E21B 43/267 |
| | | | | 703/2 |
| 2011/0301777 | A1* | 12/2011 | Cox | G06F 1/3203 |
| | | | | 713/300 |
| 2017/0372232 | A1* | 12/2017 | Maughan | G06F 3/0482 |
| 2018/0081339 | A1 | 3/2018 | Zhu | |
| 2018/0211156 | A1 | 7/2018 | Guan et al. | |
| 2019/0138423 | A1 | 5/2019 | Agerstam | |
| 2020/0125929 | A1 | 4/2020 | Guo et al. | |

(Continued)

OTHER PUBLICATIONS

Brahma (Solar Irradiance Forecasting Based on Deep Learning Methodologies and Multi-Site Data, Nov. 2020, pp. 1-20) (Year: 2020).*

(Continued)

*Primary Examiner* — George Giroux (74) *Attorney, Agent, or Firm* — Hanley, Flight & Zimmerman, LLC (57) ABSTRACT

Implementations are described herein for leveraging teleconnections and location embeddings to predict geospatial measures for a geographic location of interest. In various implementations, a plurality of reference geographic locations may be identified that are disparate from a geographic location of interest and influence a geospatial measure in the geographic location of interest. One or more features may be extracted from each of the plurality of reference geographic locations. The extracted features and a location embedding generated for the geographic location of interest may be encoded into a joint embedding. A sequence encoder may be applied to the joint embedding to generate encoded data indicative of the predicted geospatial measure.

20 Claims, 5 Drawing Sheets

(56) References Cited

U.S. PATENT DOCUMENTS

| | | | |
|---|---|---|---|
| 2020/0356839 A1 | 11/2020 | Tocornal et al. | |
| 2020/0357143 A1* | 11/2020 | Chiu | G06F 18/253 |
| 2021/0057109 A1* | 2/2021 | Rogan | G06Q 30/0205 |
| 2021/0271707 A1* | 9/2021 | Lin | G06F 40/216 |
| 2021/0342586 A1* | 11/2021 | Fleisig | G06V 10/457 |
| 2021/0350239 A1* | 11/2021 | Wang | G06F 18/213 |
| 2022/0061236 A1 | 3/2022 | Guan et al. | |
| 2022/0290989 A1 | 9/2022 | Bronevetsky | |

OTHER PUBLICATIONS

Pozdnoukhov et al. (Data-driven topo-climatic mapping with machine learning methods, Jan. 2009, pp. 497-518) (Year: 2009).*

Mai et al. (Multi-Scale Representation Learning For Spatial Feature Distributions using Grid Cells, Feb. 2020, pp. 1-15) (Year: 2020).*

Tsubouchi et al. (POI Atmosphere Categorization Using Web Search Session Behavior, Nov. 2020, pp. 1-10) (Year: 2020).*

Jiang (A Survey on Spatial Prediction Models, Sep. 2019, pp. 1645-1664) (Year: 2019).*

Zhang et al. (Unifying Inter-region Autocorrelation and Intra-region Structures for Spatial Embedding via Collective Adversarial Learning, Jul. 2019, pp. 1700-1708) (Year: 2019).*

Alhamshry, A. et al., "Prediction of summer rainfall over the source region of the Blue Nile by using telecommunications based on sea surface temperature"; Theoretical and Applied Climatology, vol. 137, No. 3; pp. 3077-3087; dated Feb. 8, 2019.

Chang, N-B. et al., "The impact of global unknown teleconnection patterns on terrestrial precipitation across North and Central America"; Atmospheric Research, vol. 193; pp. 107-124; dated Apr. 7, 2017.

European Patent Office; International Search Report and Written Opinion issued in Application. No. PCT/US/2022/016784; 13 pages; dated Jun. 1, 2022.

Samana et al., "You Are Here: Geolocation by Embedding Maps and Images" arXiv:1911.08797v2 [cs.CV]. 18 pages. Dated Jul. 22, 2020.

Wu et al., "DeepETA: A Spatial-Temporal Sequential Neural Network Model for Estimating Time of Arrival in Package Delivery System" The Thirty-Third AAAI Conference on Artificial Intelligence (AAAI-19) 8 pages. 2019.

Wang et al., "BSENet: A Data-Driven Spatio-Temporal Representation Learning for Base Station Embedding" IEEE Access. Digital Object Identifier 10.1109/ACCESS.2020.2980597. 10 pages. Dated Mar. 24, 2020.

Mai et al., "Multi-Scale Representation Learning For Spatial Feature Distributions Using Grid Cells" Published As A Conference Paper At ICLR. 15 pages. 2020.

"Loc2Vec: Learning location embeddings with triplet-loss networks" Sentiance. Retreived from https://www.sentiance.com/2018/05/03venue-mapping/ 22 pages. Dated Jan. 4, 2021.

Schubert et al., "A U.S. Clivar Project to Assess and Compare the Responses of Global Climate Models to Drought-Related SST Forcing Patterns: Overview and Results" 2009 American Meteorological Society. DOI: 10.1175/2009JCLI3060.1. vol. 22. 22 pages. Oct. 1, 2009.

Ross et al., "A Climatology of 1980-2003 Extreme Weather and Climate Events" US Department of Commerce NOAA/NESDIS National Climatic Data Center. Technical Report No. 2003-01. Dec. 2003.

Reichstein et al., "Deep learning and process understanding for data-driven Earth system science" Perspective. https://doi.org/10.1038/s41586-019-1912-1. vol. 566. Feb. 14, 2019.

Park et al., "A key process of the nonstationary relationship between ENSO and the Western Pacific teleconnection pattern" Scientific Reports. DOI:10.1038/s41598-018-27906-z. Jun. 22, 2018.

Ntale et al., "Drought Indices and Their Application to East Africa" International Journal of Climatology. Wiley InterScience. DOI: 10.1002/joc.931. 2003.

Murphy, "Climatology, Persistence, and Their Linear Combination as Standards of Reference in Skill Scores" American Meteorological Society. vol. 7. 1992.

Mishra et al., "A Review of Drought Concepts" Journal of Hydrology. Elsevier. DOI:10.1016/j.jhydrol.2010.07.012. 15 pages. 2010.

Mann et al., "Climate change and California drought in the 21st century" PNAS. www.pnas.org/cgi/doi/10.1073/pnas.1503667112. vol. 112. No. 13. 2 pages. Mar. 31, 2015.

Mamalakis et al., "A new interhemispheric teleconnection increases predictability of winter precipitation in southwestern US" Nature Communications. DOI:10.1038/s41467-018-04722-7. 10 pages. 2018.

Comte, "1996 Weather Highlights: Around the World" Weatherwise, 50:1, 25-27, DOI:10.1080/00431672.1997.9926016. 4 pages. Jul. 8, 2010.

Janowicz et al., "GEoAI: spatially explicit artificial intelligence techniques for geographic knowledge discovery and beyond" International Journal of Geographical Information Science, 34:4, 625-636, DOI:10.1080/13658816.2019.1684500. 13 pages. 2020.

Horridge et al., "The impact of the 2002-2003 drought in Australia" Journal of Policy Modeling. Elsevier. 24 pages. Jan. 29, 2005.

Dai, "Drought under global warming: A. Review" Advanced Review. John Wiley & Sons, Ltd. vol. 2. 21 pages. 2011.

Anh et al., "Downscaling rainfall using deep learning long short-term memory and feedforward neural network" International Journal of Climatology. DOI:10.1002/joc.6066. 19 pages. Mar. 6, 2019.

Park et al., "A key process of the nonstationary relationship between ENSO and the Western Pacific teleconnection pattern" Scientific Reports. DOI:10.1038/s41598-018-27906-z. 13 pages. Jun. 22, 2018.

Goodfellow et al., "Generative Adversarial Nets" arXiv:1406.2661v1 [stat.ML]. 9 pages. Jun. 10, 2014.

Wilhite, "Preparing for Drought: A guidebook for developing countries" United Nations Environment Programme. 80 pages. 1992.

Spinoni et al., "The biggest drought events in Europe from 1950 to 2012" Journal of Hydrology: Regional Studies 3. Elsevier. https://dx.doi.org/10.1016/j.ejrh.2015.01.001. 16 pages. 2015.

Seager et al., "Causes of the 2011-2014 California Drought" Journal of Climate. vol. 28. DOI:10.1175/JCLI-D014-00860.1. 28 pages. Sep. 15, 2015.

Schubert et al., "Global Meteorological Drought: A Synthesis of Current Understanding with a Focus on SST Drivers of Precipitation Deficits" American Meteorological Society. DOI:10.1175/JCLI-D-15-0452.1. vol. 29. 31 pages. Jun. 1, 2016.

Zhang et al., "Drought over East Asia: A Review" American Meteorological Society. DOI:10.1175/JCLI-D-14-00259.1. vol. 28. 25 pages. Apr. 15, 2015.

Yan et al., "From ITDL to Place2Vec-Reasoning About Place Type Similarity and Relatedness by Learning Embeddings from Augmented Spatial Contexts" SIGSPATIAL. 10 pages. Nov. 2017.

Zhang et al., "Joint Deep Learning for land cover and land use classification" Ordance Survey. Lancaster University (No. EAA7369).

Choi et al., "Uncertainty in future projections of the North Pacific subtropical high and its implication for California winter precipitation change" Journal of Geophysical Research: Atmospheres. DOI:10.1002/2015JD023858. 12 pages. 2016.

He et al., "Streaming End-To-End Speech Recognition For Mobile Devices" arXiv:1811306621v1 [cs.CL] 5 pages. Nov. 15, 2018.

Hao et al., "Seasonal Drought Prediction: Advances, Challenges, and Future Prospects" Review of Geophysics. DOI:10.1002/2016RG000549. 34 pages. Jan. 27, 2018.

Frauen et al., "Analysis of the Nonlinearity of El Nino-Southern Oscillations Teleconnections" American Meteorological Society. DOI:10.1175/JCLI-D-13-00757.1. 20 pages. Aug. 15, 2014.

Erfanian et al., "Unprecedented drought over tropical South America in 2016: significantly under-predicted by tropical SST" Scientific Reports. DOI:10.1038/s41598-017-05373-2. 11 pages. Jul. 19, 2017.

Enfield et al., "How ubiquitous is the dipole relationship in tropical Atlantic sea surface temperatures" Journal of Geophysical Research. vol. 104. No. C4. 8 pages. Apr. 15, 1999.

Devlin et al., "BERT: Pre-Training of Deep Bidirectional Transformers for Language Understanding" arXiv:1810.04805v2 [cs.CL]. 16 pages. May 24, 2019.

(56) References Cited

OTHER PUBLICATIONS

Batterbury et al., "The African Sahel 25 years after the great drought: assessing progress and moving towards new agendas and approaches" Global Environmental Change. Elsevier Science Ltd. 8 pages. 2001.

Ziat et al., "Spatio-Temporal Neural Networks for Space-Time Series Forecasting and Relations Discovery" arXiv:1804.08562v1 [cs.LG]. 10 pages. Apr. 23, 2018.

Gou et al., "DeepOcean:A Genearl Deep Learning Framework for Spatio-Temporal Ocean Sensing Data Prediction" IEEE Acess. vol. 8. 11 pages. Apr. 28, 2020.

Zhu et al., "Learning Temporal and Spatial Correlations Jointly: A Unified Framework for Wind Speed Prediction" IEEE. DOI:10.1109/tste.2019.2897136. 14 pages. 2019.

Ham et al., "Deep learning for multi-year ENSO forecasts" Nanjing University, https://doi.org/10.1038/s41586-019-1559-7. 18 pages; dated Sep. 18, 2019.

Cong et al.; Multi-scale Bushfire Detection from Multi-modal Streams of Remote Sensing Data; ResarchGate; 18 pages; dated Dec. 2020.

Guan K.; et al.; Accessing Agriculture Productivity and Sustainability; 90 pages; dated Aug. 2020.

\* cited by examiner

PREDICTING GEOSPATIAL MEASURES

BACKGROUND

Accurately predicting geospatial measures such as local climate conditions can be useful for a variety of reasons. Suppose it is predicted that a geographic location of interest—e.g., a county, state, agricultural area such as a wine region, etc.—is going to receive less precipitation than usual. Farmers can plan accordingly, e.g., by selecting drought-resistant crops or by upgrading or installing more comprehensive irrigation systems. However, it is difficult to accurately predict local climate conditions because there are myriad contributing factors, some local, others faraway. For example, sea surface temperatures and/or atmospheric pressure in one portion of an ocean may heavily influence precipitation levels over a faraway land region weeks or even months later. The causal relationship/correlation between two otherwise remote geographic locations is referred to as a "teleconnection."

SUMMARY

Implementations are described herein for leveraging teleconnections and, in some implementations, location embeddings, to predict geospatial measures for a geographic location of interest. A "location embedding" is a feature vector or feature embedding that is generated for a geographic location of interest. The location embedding may be encoded with various information about or otherwise relevant to the geographic location of interest. For example, in some implementations, the location embedding may capture both "spatial heterogeneity," and "spatial dependence". Spatial heterogeneity is a variance of geospatial data across geographic locations, described by a first-order statistic, which reflects the uniqueness of each geographic location in terms of geospatial data (e.g., precipitation, geology, vegetation, temperature, soil moisture, air pollution, etc.) relative to other geographic locations.

By contrast, according to Tobler's First Law of Geography, geographic locations that are close to each other often (but not always) exhibit similar characteristics and have similar properties such as climate patterns, soil, vegetation, geology, topography, etc. This dependency of geospatial data across proximate geographic locations—which stands in contrast to spatial heterogeneity and can be described using second-order statistics—is called "spatial dependence" or "spatial autocorrelation." Encoding a location embedding that captures both spatial heterogeneity and spatial dependence may strike a balance between the two different types of data that avoids overfitting one way or the other.

In various implementations, a teleconnection model may be used to identify one or more reference geographic locations that influence a geospatial measure in a geographic location of interest. Once identified, various teleconnection features that influence the geospatial measure of the geographic location of interest may be extracted. These extracted teleconnection features may be highly correlated with the targeted geospatial measure in the geographic location of interest, and may include, for instance, sea surface temperature, atmospheric pressure, and so forth. Teleconnections strengths may also vary from location to location and show spatial autocorrelation patterns. To capture this, in some implementations, these selected teleconnection features may be applied as inputs to an encoder, e.g., along with the location embedding, to generate a joint embedding that contains both teleconnection-derived information and location embedding information. The encoder may take various forms. In some implementations, the encoder may include a feed forward neural network/layer that generates, e.g., for each time step of a series of time steps (e.g., daily, weekly, monthly), a joint embedding that captures the extracted teleconnection features and location embedding for that time step.

In various implementations, the joint embedding (or embeddings, if generated for each of a series of time steps) may be processed using a machine learning model. In some implementations, the machine learning model may be a sequence encoder such as a recurrent neural network ("RNN"), long short-term memory ("LSTM") network, a gated recurrent unit ("GRU") network, etc. The inputs to such a model, including the extracted teleconnection features, may thus be time-series data, such as periodic sea surface temperatures, periodic atmospheric pressures, or other periodic geospatial samples. Similarly, a temporally-correspondent location embedding may be encoded for each time step. In some such implementations, these location embeddings may capture spatial heterogeneity and/or spatial dependence mentioned previously.

In various implementations, the output of the sequence encoder at each time step may be indicative for a predicted geospatial measure at the next time step. Thus, in various implementations, a future geospatial measure may be predicted for a geographic location of interest by processing data as described above according to some number of past time steps (e.g., the past x months). In some implementations, a decoder (e.g., one or more neural network layers) may be provided that decodes output of the sequence encoder at each time step into a form that conveys the predicted geospatial measure. Thus, the decoder applied to the last time step's output may convey the predicted geospatial measure.

While many implementations described herein rely on sea surface temperatures (or more generally, water surface temperatures), this is not meant to be limiting. In other words, teleconnections to target datasets may be established from source datasets other than water surface temperatures. For example, atmospheric temperatures and/or pressure over one region of an ocean (or even over a different region of land) may influence another climate condition over a particular geographic region sometime in the future. Sea surface pressures may also be considered as source datasets.

In some implementations, a method for predicting a geospatial measure in a geographic location of interest may be implemented using one or more processors and may include: identifying a plurality of reference geographic locations that are disparate from the geographic location of interest and influence the geospatial measure in the geographic location of interest; extracting one or more features from each of the plurality of reference geographic locations; encoding the extracted features and a location embedding generated for the geographic location of interest into a joint embedding; and applying a sequence encoder to the joint embedding to generate encoded data indicative of the predicted geospatial measure.

In various implementations, the method may include applying the encoded data indicative of the predicted geospatial measure as input across a decoder to generate the predicted geospatial measure. In various implementations, the sequence encoder may be a long short-term memory (LSTM) network. In various implementations, the one or more features extracted from each of the plurality of reference geographic locations may include time series sea surface temperatures.

In various implementations, each of the plurality of reference geographic locations may be related to the geographic location of interest via a teleconnection. In various implementations, the location embedding may be encoded to capture spatial heterogeneity associated with the geographic location of interest. In various implementations, the location embedding may be further encoded to capture spatial dependence associated with the geographic location of interest and one or more neighboring geographic locations. In various implementations, the applying may include applying the trained machine learning model to historical climate data associated with the geographic location of interest.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
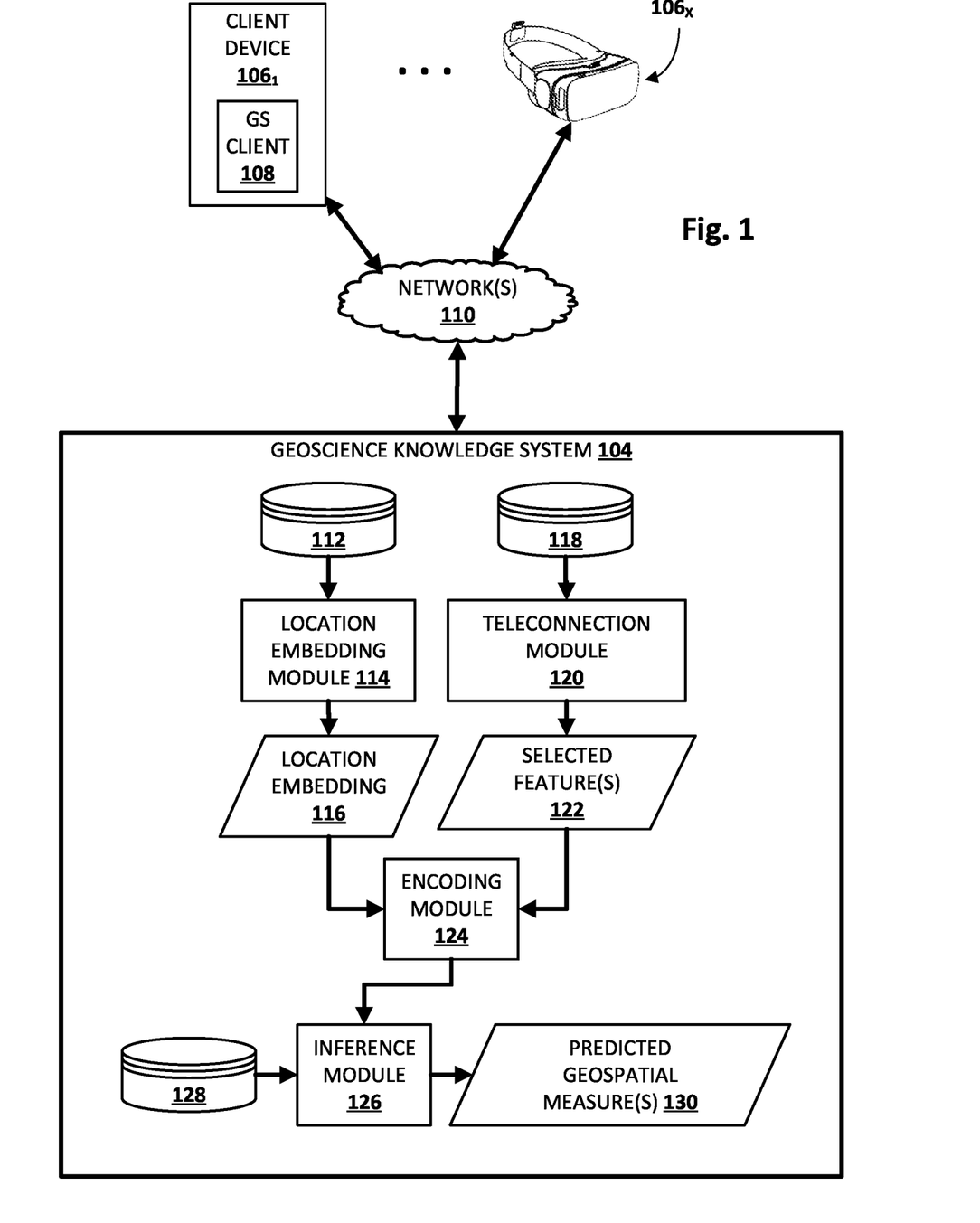
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. The example environment includes various components that may be configured to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc. Various components depicted in FIG. 1 and elsewhere may be implemented using any combination of hardware and software.

An individual or "user" may operate one or more client devices $106_{1-X}$ to interact with other components depicted in FIG. 1, such as a geospatial knowledge system 104. A client device 106 may be, for example, a desktop computing device, a laptop computing device, a tablet computing device, a mobile phone computing device, a computing device of a vehicle of the participant, a standalone interactive speaker (with or without a display), or a wearable apparatus that includes a computing device, such as a head-mounted display ("HMD") $106_X$ that provides an AR or VR immersive computing experience, a "smart" watch, and so forth. Additional and/or alternative client devices may be provided.

Geospatial knowledge system 104 is an example of an information system in which the techniques described herein may be implemented. Each of client devices 106 and geospatial knowledge system 104 may include one or more memories for storage of data and software applications, one or more processors for accessing data and executing applications, and other components that facilitate communication over a network. The operations performed by client device 106 and/or geospatial knowledge system 104 may be distributed across multiple computer systems.

Each client device 106 may operate a variety of different applications that may be used to perform various geospatial tasks, such predicting various geospatial measures such as climate conditions (e.g., the Palmer drought severity index, or "PDSI"), etc. For example, a first client device $106_1$ operates geospatial ("GS") client 108 (e.g., which may be standalone or part of another application, such as part of a web browser). Another client device $106_X$ may take the form of a HMD that is configured to render 2D and/or 3D data to a wearer as part of a VR immersive computing experience. The wearer may interact with the presented data, e.g., using HMD input techniques such as gaze directions, blinks, etc.

In some implementations, GS client 108 may be used to output recommendations and/or information that can help personnel in various domains (e.g., agricultural, urban planning, climate science, etc.) perform various geospatial tasks. For example, components of geospatial knowledge system 104 may perform selected aspects of the present disclosure to make geospatial predictions for a geographic location of interest, e.g., so that the personnel may take affirmative action and/or plan accordingly.

As used herein, a "geographic location of interest" or simply "geographic location" may refer to a discrete geographic area (or to a reference point thereof, such as its center) of varying sizes and/or shapes that can be defined in various ways. In some implementations, a geographic location may identify an area or region that is subject to generally homogenous or uniform climate conditions, e.g., compared to other geographic regions nearby or faraway. For example, a particular valley that extends across a state or county may experience relatively uniform climate conditions along its length, and therefore may be defined as a discrete geographic area. In some implementations, a greater geographic area may be organized into a two-dimensional grid of cells, with each individual cell corresponding to a discrete geographic location. In some implementations, each cell may correspond to one or more pixels of satellite imagery. In other implementations, a geographic location of interest may be defined politically (e.g., one or more counties, one or more states).

In various implementations, geospatial knowledge system 104 may be implemented across one or more computing systems that may be referred to as the "cloud." Geospatial knowledge system 104 may include a location embedding module 114 that is configured to generate, based on data obtained from a historical geospatial database 112, a location embedding 116 that succinctly and accurately represents, in a reduced-dimensionality form, spatial heterogeneity and spatial dependence associated with the geographic location of interest. Although shown as part of a centralized cloud infrastructure in FIG. 1, in some implementations, historical geospatial database 112 (and/or location embedding module 114) may be distributed across multiple different locations. For example, instances of database 112 and/or module 114 may be maintained locally within and/or near each geographic location of interest, e.g., by local farmers or co-ops, commercial agricultural entities, government departments of agriculture, etc.

Data retrieved from historical geospatial database 112 and used by location embedding module 114 to generate location embedding 116 may come in various forms and may include a wide variety of data about the geographic location of interest. This data may include, for instance, soil moisture measurement(s), weather data such as precipitation, humidity, wind, sunlight exposure, and other similar data. In some implementations, this data may include time-series data, such as periodic soil moisture measurements, recorded weather events over time, precipitation over time, sunlight exposure over time, etc. In some implementations, this data may include historical climate conditions observed in the geographic location of interest. These historical climate conditions may or may not correspond to geospatial measure(s) that are ultimately being predicted using techniques described herein.

Geospatial knowledge system 104 may also include a teleconnection module 120 that is operably coupled with a teleconnection database 118. Teleconnection module 120 may be configured to select various geospatial features 122 from teleconnection database 118 that are applicable to a geographic location of interest. In particular, teleconnection module 120 may identify a teleconnection (e.g., a mapping in database 118) that associates particular reference geographic location(s) with a particular geographic location of interest, e.g., for a given time lag. Features 122 extracted by teleconnection module 120 from these reference geographic location(s) via teleconnection database 118 may be heavily predictive and/or highly influential of geospatial conditions in the geographic location of interest some time lag later (e.g., weeks or month(s) later).

In some implementations, teleconnection database 118 may include information about water surface temperatures (also referred to as "sea surface temperatures") across one or more bodies of water. In some implementations, bodies of water such as the Earth's oceans and seas (and lakes if large enough) may be logically divided into a grid of cells, e.g., with each cell having a size of x km by x km each (with x being a positive integer). Teleconnection database 118 may include water surface temperatures observed in each of these predefined cells. In some such implementations, the cells may be defined so that each cell includes relatively homogenous water surface temperatures throughout. In some implementations, if multiple sample temperatures are obtained from a single logical cell, then an average of those sampled temperatures may be used for the whole cell.

Teleconnection database 118 is not limited to water surface temperatures. In some implementations, teleconnection database 118 may include other types of geospatial conditions that may be influential on disparate geographic locations of interest after various time lags. For example, in addition to or instead of water surface temperature, atmospheric pressures at various points over a body of water or over land (e.g., in the predefined cells mentioned previously) may influence climate conditions of the geographic location of interest after various time lags. Additionally or alternatively, sea surface pressure in various areas, such as the predefined cells mentioned previously, may also influence climate condition(s) in the geographic location of interest after some time lag. These are just examples, and other climate parameters of oceans may also be considered.

Teleconnection module 120 may select climate features 122 from teleconnection database 118 in various ways. In some implementations, teleconnection module 120 may select climate features using a desired time lag (e.g., one month ago or −1, two months ago or −2, etc.) along with temporally-corresponding location embedding(s) 116. In some implementations, a location embedding 116 generated by location embedding module 114 for a geographic location of interest may be used as input for teleconnection module 120 to identify one or more influential reference geographic locations, such as one or more ocean cells mentioned previously. Water surface temperatures in these cells may have been highly influential in causing historical climate condition(s) that are "baked into" the location embedding of the geographic location of interest.

Encoding module 124 may be configured to encode location embedding 116 and the features 122 selected/extracted by teleconnection module 120 into a joint embedding (not depicted in FIG. 1). This joint embedding may represent/include, e.g., for a given time step in a sequence of time steps, information about both the geographic location of interest and other geographic locations (e.g., remote areas over the ocean) that are influential on the geographic location of interest. Thus, where location embeddings 116 and selected features 122 take the form of a sequence of time-series data, the joint embedding may correspond to a sequence of joint embeddings. In some implementations, encoding module 124 may generate one or more encodings and concatenate these encodings into the joint embedding. For example, the teleconnection features 122 may be encoded into one "dense" teleconnection embedding (242 in FIG. 2), and this dense teleconnection embedding may be combined (e.g., concatenated) with other data, such as location embedding 116.

Inference module 126 may be configured to apply machine learning models stored in a machine learning model database 128 to the joint embeddings generated by encoding module 124. Based on this application, inference module 126 may generate data indicative of predicted geospatial measure(s) 130 of agricultural areas of interest. Various types of machine learning models may be trained to predict climate conditions in accordance with various aspects of the present disclosure. In some implementations, a sequence encoder such as a recurrent neural network ("RNN"), long short-term memory ("LSTM") network, a gated recurrent unit ("GRU") network, a transformer network, etc., may be employed to generate geospatial predictions 130 based on time-series data.

In some implementations, different sequence encoders may be trained for different geographic locations of interest. For example, one sequence encoder may be trained for Napa Valley in California. Another sequence encoder may be trained for Burgundy territory of France. Another sequence encoder may be trained for a homogenous agricultural area in the American Midwest. And so on. In this specification, the term "database" and "index" will be used broadly to refer to any collection of data. The data of the database and/or the index does not need to be structured in any particular way and it can be stored on storage devices in one or more geographic locations.

Figure 2:
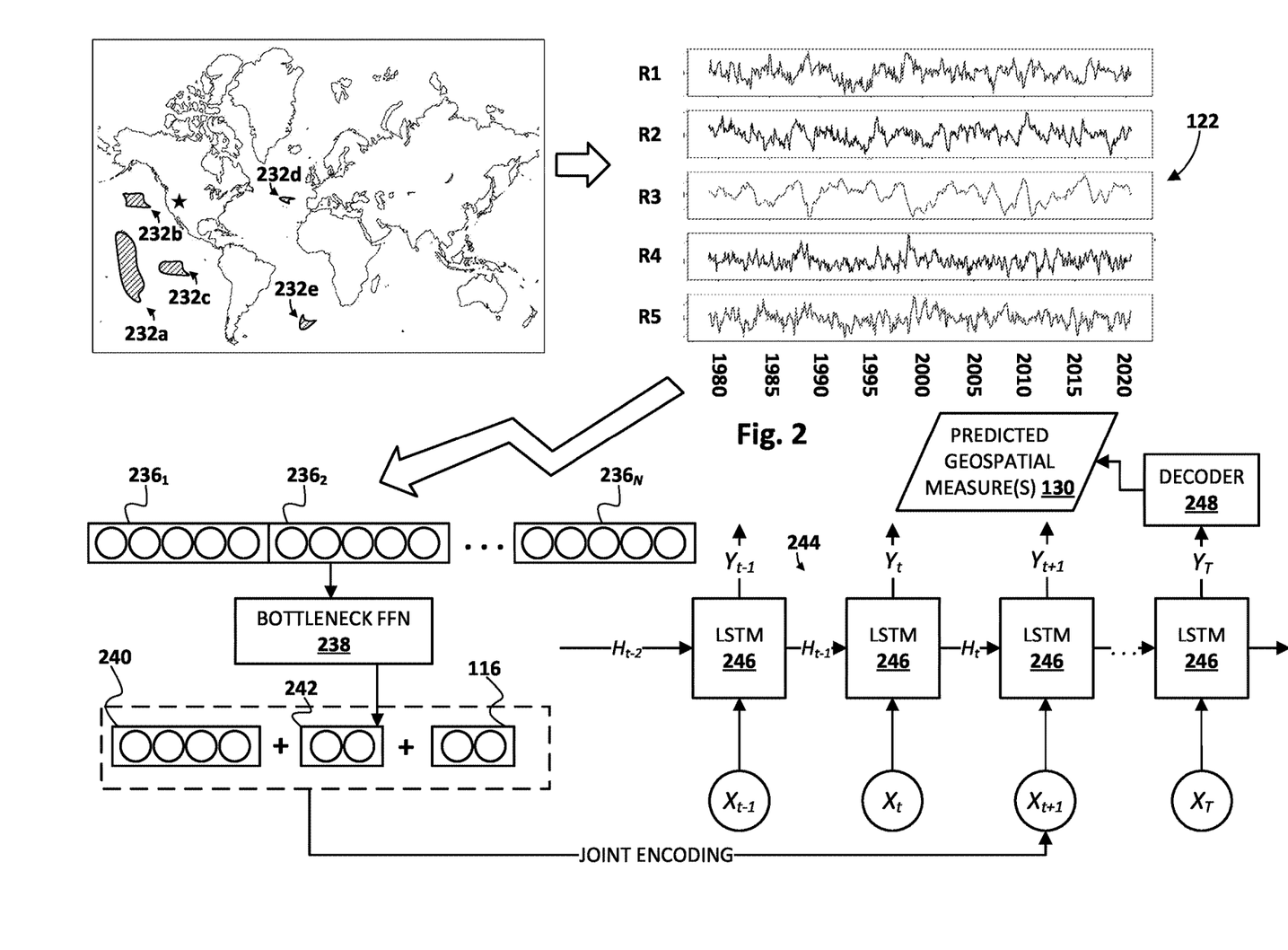
FIG. 2 schematically depicts components and a data flow that can be implemented to practice selected aspects of the present disclosure, in accordance with various implementations.

FIG. 2 depicts an overall process for generating geospatial prediction(s) 130 using techniques described herein. Starting at top left, a map is depicted with a star denoting a geographic location of interest, which in this example is in the western United States. Also depicted are a plurality of disparate geographic locations (or "areas") 232a-e that have been determined to be influential upon (e.g., connected by a teleconnection to) the geographic location of interest, at least for a given time lag. In some implementations, a slightly different set of disparate geographic locations 232a-e may be identified, e.g., by teleconnection module 120, for each time step in a sequence of time steps for which time-series data is available.

Teleconnection features 122 associated with the five disparate geographic locations 232a-e are represented as R1-R5 at top right in FIG. 2. While depicted as sea surface temperature anomalies in FIG. 2 for illustrative purposes, this is not meant to be limiting. In various implementations, and following the down-left arrow in FIG. 2, these five teleconnection features R1-R5 associated with disparate geographic locations 232a-e may be extracted and used to generate corresponding feature vectors $236_{1-N}$ for each of N (positive integer) time steps. In some implementations, teleconnection feature vectors $236_{1-N}$ may be processed, e.g., by encoding module 124, using a bottleneck feed-forward network (FFN in FIG. 2) 238 to generate what will be referred to herein as a "dense" teleconnection embedding 242 that reduces the dimensionality of the teleconnection feature vectors $236_{1-N}$. For example, teleconnection feature vectors $236_{1-N}$ may be combined, e.g., using techniques such as concatenation, and processed using bottleneck FFN 238.

In various implementations, encoding module 124 may encode dense teleconnection embedding 242 along with other data, such as local data 240 measured from the geographic location (e.g., for the same time step) and/or a location embedding 116 to generate a joint encoding. In some implementations, this process may include concatenation, as indicated by the plus signs in FIG. 2. The joint encoding may then be processed, e.g., by encoding module 124 or inference module 126, as an input to a sequence encoder 244.

Sequence encoder 244 in FIG. 2 takes the form of an LSTM 246 that is depicted in FIG. 2 in its "unfolded" state. At each time step t (positive integer), an input $X_t$ is applied as input across LSTM 246, along with state data $H_{t-1}$ from a previous time step, to generate output $Y_t$. Output $Y_T$ at a final time step T may be encoded data indicative of the predicted geospatial measure(s) 130. In some implementations, output $Y_T$ at time T may be processed, e.g., by inference module 126 using a decoder 248, to generate predicted geospatial measure(s) 130. Decoder 248 may take various forms, such as a feed-forward neural network or a sequence decoder. In various implementations, decoder 248 may be trained in tandem with sequence encoder 244 by minimizing a loss function. For example, output $Y_t$ generated at a time step t may be compared to a ground truth geospatial measure observed/calculated at that time step t. Any difference or error between these values may be used to train sequence encoder 244 and decoder 248 by adjusting their respective parameters using techniques such as gradient descent and back propagation.

Figure 3:
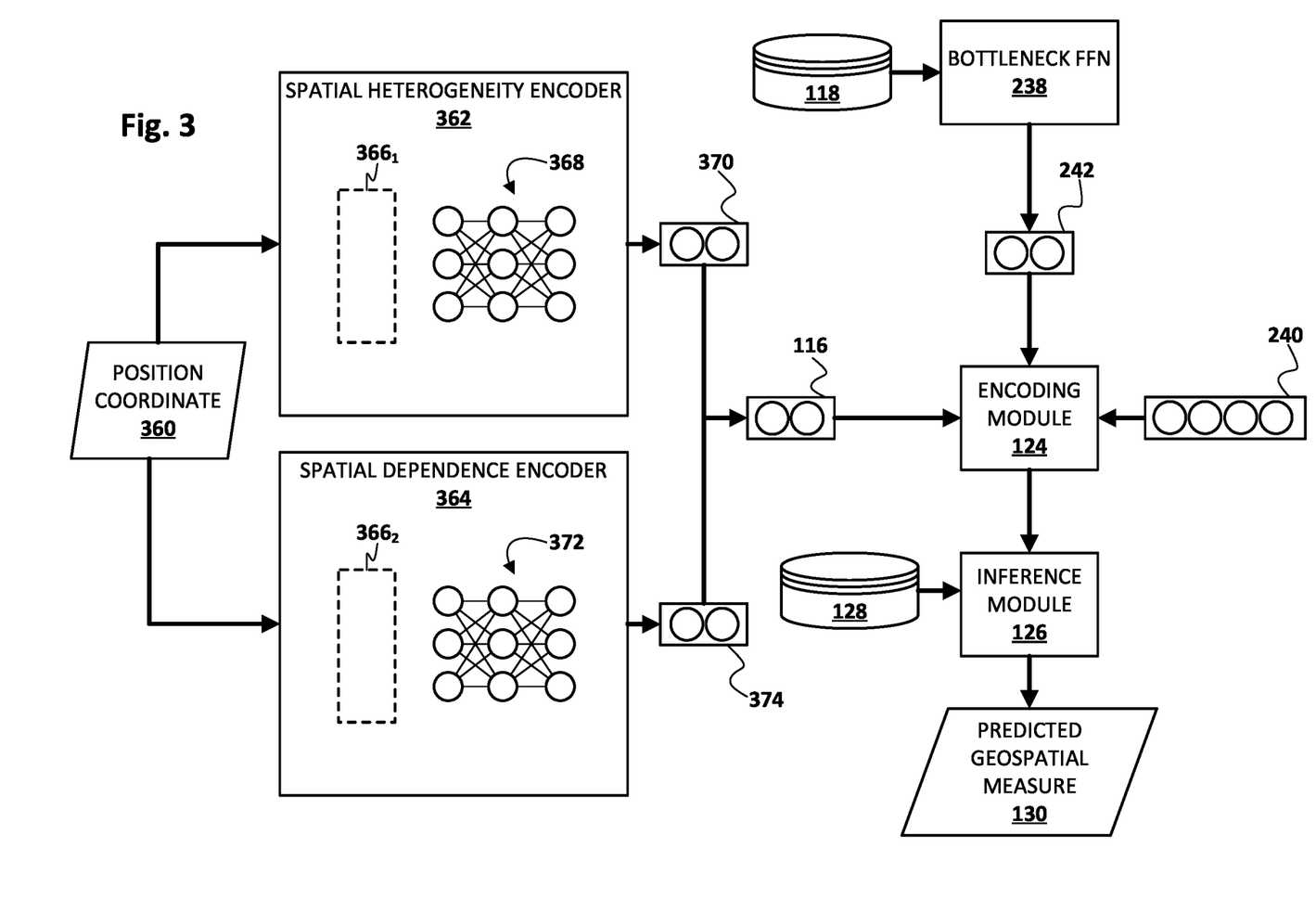
FIG. 3 schematically depicts an example of how a location embedding may be generated for use with techniques described herein, in accordance with various implementations.

FIG. 3 depicts a non-limiting example process flow for practicing selected aspects of the present disclosure to generate a location embedding (e.g., 116) and predict a geospatial measure based on the location embedding generated using techniques described herein. Starting at left, a position coordinate 360 identifying a geographic location—e.g., a geographic location for which a geospatial prediction is desired—is provided as input. Position coordinate 360 may take various forms, depending on a variety of factors, such as how a greater geographic area is organized logically into smaller geographic locations. In some implementations, position coordinate 360 may take the form of a longitude and a latitude. Additionally or alternatively, in some implementations, position coordinate 360 may take the form of an x and y coordinate that identifies a center point of a cell in a two-dimensional grid of cells, in which each cell may correspond to a separate geographic location.

Position coordinate 360 may be processed based on a spatial heterogeneity encoder 362 and a spatial dependence encoder 364. In some implementations, the processing that occurs using each of these encoders 362, 364 may occur in parallel to the processing that occurs using the other of these encoders 362, 364, although this is not required.

Spatial heterogeneity encoder 362 may take various forms. In FIG. 3, for instance, spatial heterogeneity encoder 362 includes a first multi-scale feature decomposition layer $366_1$. In various implementations, first multi-scale feature decomposition layer $366_1$ may convert position coordinate 360 of relatively few dimensions, such as two (e.g., x and y, longitude and latitude), into a vector of greater dimensions, such as sixty-four. This vector of greater dimensions generated by first multi-scale feature decomposition layer $366_1$ may then be applied as input across a spatial heterogeneity neural network 368 to generate a first location embedding 370. In various implementations, spatial heterogeneity encoder 362, including aspects of first multi-scale feature decomposition layer $366_1$ and/or spatial heterogeneity neural network 368, may have been trained previously—e.g., separately or jointly with spatial dependence encoder 364—to capture spatial heterogeneity of one or more geospatial measures associated with a plurality of geographic locations. Consequently, first location embedding 370 also captures this spatial heterogeneity.

Spatial dependence encoder 364 likewise may take various forms. In FIG. 3, for instance, spatial dependence encoder 364 includes a second multi-scale feature decomposition layer $366_2$, which may be the same as or at least similar to first multi-scale feature decomposition layer $366_1$. Similar to before, second multi-scale feature decomposition layer $366_2$ may convert position coordinate 360 of relatively few dimensions, such as two (e.g., x and y, longitude and latitude), into a vector of greater dimensions, such as sixty-four. This vector of greater dimensions generated by second multi-scale feature decomposition layer $366_2$ may then be applied as input across a spatial dependence neural network 372 to generate a second location embedding 374. In various implementations, spatial dependence encoder 364, including aspects of second multi-scale feature decomposition layer $366_2$ and/or spatial dependence neural network 372, may have been trained previously—e.g., separately or jointly with spatial heterogeneity encoder 362—to capture spatial dependence of geospatial measures associated with a plurality of geographic locations. For example, training techniques such as triplet loss may have been performed to index and/or map spatial dependencies in an embedding space. Consequently, second location embedding 374 also captures this spatial dependence.

In various implementations, first location embedding 370 and second location embedding 374 may be combined, e.g., by encoding module 124, into combined location embedding 116. Combined location embedding 116 may be generated from first location embedding 370 and second location embedding 374 in various ways, such as by using concatenation, addition, averaging, and so forth. Because first location embedding 370 and second location embedding 374 individually capture, respectively, spatial heterogeneity and spatial dependence of geospatial measures associated with the geographic location of interest, combined location embedding 116 also captures spatial heterogeneity and spatial dependence of these geospatial measures.

Encoding module 124 may encode combined location embedding 116, dense teleconnection embedding 242 described previously, and other data 240 into a joint encoding as depicted at bottom left of FIG. 2. Then, as described previously with respect to FIG. 2, inference module 126 may apply one or more machine learning models (e.g., LSTM 246) from database 128 to joint encoding, e.g., to a temporal sequence of joint encodings, to generate the predicted geospatial measure 130. Because combined location embedding 116 captures both spatial heterogeneity and spatial dependence of the geospatial measures associated with the geographic location of interest, these data characteristics are also captured in predicted geospatial measure 130.

Other types of location embeddings may be used instead of location embedding(s) 116 generated using the process depicted in FIG. 3. For example, in some implementations, a location embedding may be used that incorporates both position coordinates (e.g., longitude and latitude) and a spatial context of geographic objects such as points of interest in or near the geographic location. In other implementations, a tile or image-based location embedding may be used, e.g., based on high elevation digital imagery, maps, etc.

In some implementations, inference module 126 may use other data 240, in addition to or instead of location embedding 116, to generate predicted geospatial measure 130. For example, time-series data associated with various geographic locations, such as the geographic location of interest, or other geographic locations that may not necessarily be proximate to the geographic location of interest, but otherwise have similar features such as climate, soil composition, topography, etc., may be leveraged by inference module 126 to generate predicted geospatial measure 130.

Figure 4:
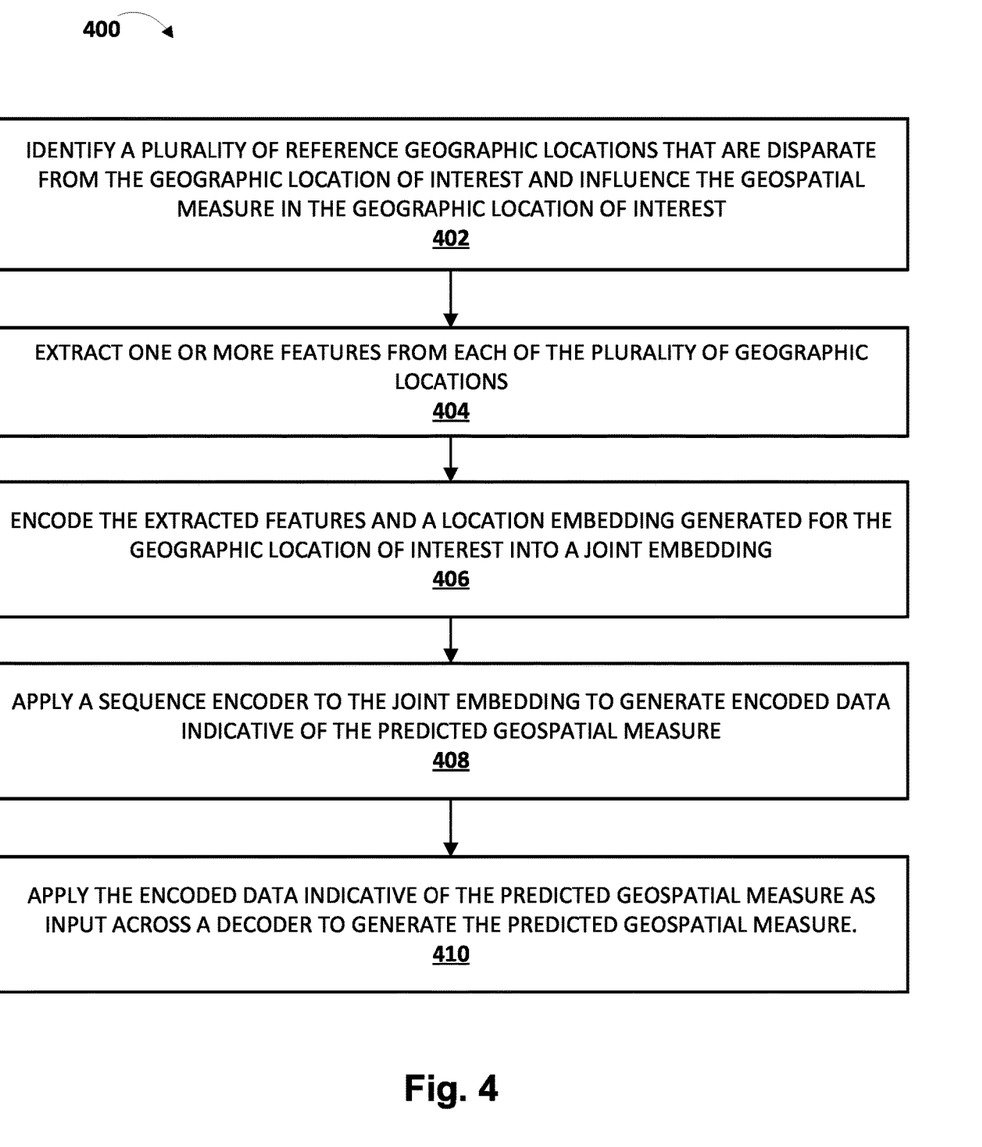
FIG. 4 is a flowchart of an example method in accordance with various implementations described herein.

FIG. 4 illustrates a flowchart of an example method 400 for predicting a geospatial measure for a geographic location of interest. The operations of FIG. 4 can be performed by one or more processors, such as one or more processors of the various computing devices/systems described herein, such as by geospatial knowledge system 104. For convenience, operations of method 400 will be described as being performed by a system configured with selected aspects of the present disclosure. Other implementations may include additional operations than those illustrated in FIG. 4, may perform step(s) of FIG. 4 in a different order and/or in parallel, and/or may omit one or more of the operations of FIG. 4.

At block 402, the system, e.g., by way of teleconnection module 120, may identify a plurality of reference geographic locations that are disparate from the geographic location of interest and that influence the geospatial measure in the geographic location of interest. For example, sea surface temperatures and/or other conditions observed in specific remote geographic locations (often areas over large bodies of water such as oceans or seas) sometime in the past may exert outsized influence (e.g., via a spatial-temporal mapping comprising a teleconnection) on current climate conditions in particular geographic locations. Teleconnection module 120 may identify these geographic locations, e.g., based on prior analysis that established teleconnections between disparate geographic locations.

At block 404, the system may extract one or more features from each of the plurality of reference geographic locations. For example, teleconnection module 120 may extract teleconnection features 122 of sea surface temperatures measured in the plurality of reference geographic locations. At block 406, the system, e.g., by way of encoding module 124, may encode the extracted features and a location embedding generated for the geographic location of interest into a joint embedding. In some implementations, one encoder (e.g., bottleneck FFN 238) may generate dense teleconnection embedding 242 as depicted in FIG. 2, and another encoder may simply concatenate dense teleconnection embedding 242 with other data, such as the location embedding 116 (and other data 240 where applicable).

At block 408, the system, e.g., by way of inference module 126, may apply a sequence encoder 244 to the joint embedding to generate encoded data (Y in FIG. 2) indicative of the predicted geospatial measure. In some implementations, sequence encoder 244 may take the form of a recurrent neural network, such as an LSTM or GRU-based network. At block 410, the system, e.g., by way of inference module 126, may apply the encoded data indicative of the predicted geospatial measure (Y in FIG. 2) as input across decoder 248 to generate the predicted geospatial measure 130.

Figure 5:
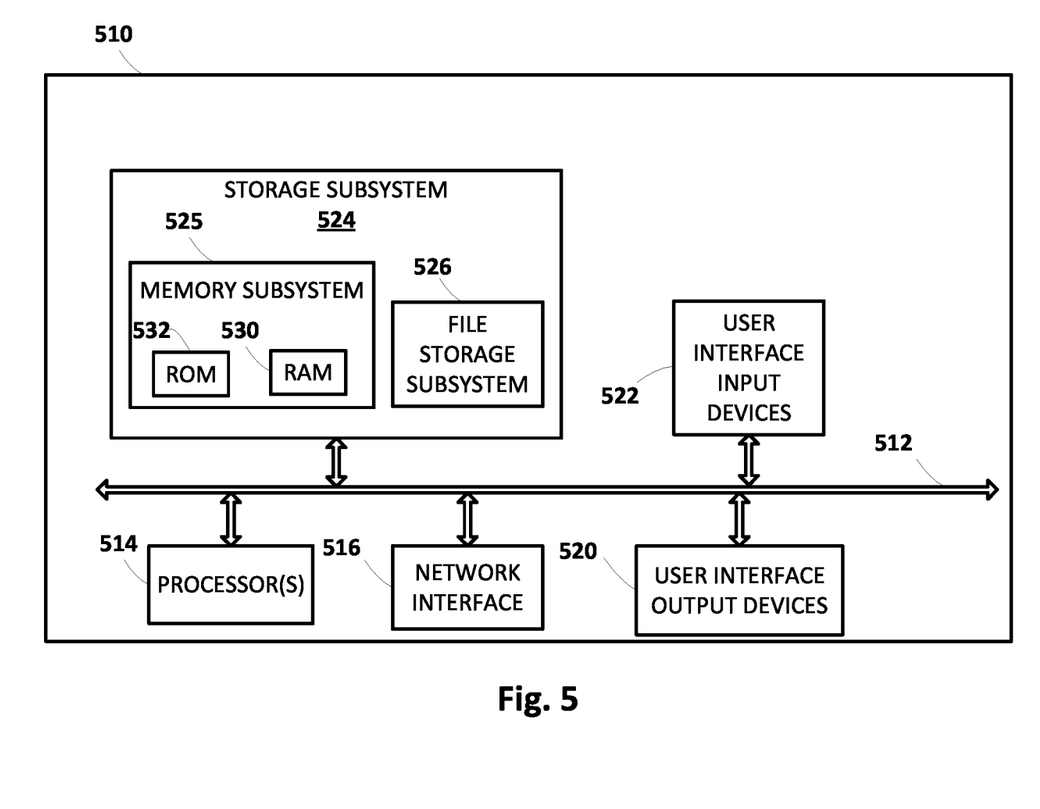
FIG. 5 schematically depicts an example architecture of a computer system.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 510 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of method 400 described herein, as well as to implement various components depicted in FIGS. 1-3.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for predicting a geospatial measure in a geographic location of interest, the method implemented using one or more processors and comprising:
   extracting one or more features from a plurality of reference geographic locations that correspond to the geographic location of interest;
   encoding a spatial heterogeneity embedding to quantify uniqueness of the features with respect to the plurality of reference geographic locations;
   encoding a spatial dependence embedding to quantify similarities of the features with respect to the plurality of reference geographic locations;
   encoding the extracted features, the spatial heterogeneity embedding, and the spatial dependence embedding into a joint embedding;
   applying a sequence encoder to the joint embedding to generate encoded data indicative of a predicted geospatial measure; and
   applying the encoded data indicative of the predicted geospatial measure as input across a decoder to generate the predicted geospatial measure, wherein the decoder and the sequence encoder are trained together by minimizing a loss function.

2. The method of claim 1, wherein the sequence encoder includes a long short-term memory (LSTM) network.

3. The method of claim 1, wherein the one or more features extracted from each of the plurality of reference geographic locations include time series sea surface temperatures.

4. The method of claim 1, wherein each of the plurality of reference geographic locations is related to the geographic location of interest via a teleconnection.

5. The method of claim 1, wherein the applying includes applying the sequence encoder to historical climate data associated with the geographic location of interest.

6. The method of claim 1, wherein encoding the joint embedding further includes applying a bottleneck feed-forward network to the extracted features.

7. The method of claim 1, wherein the plurality of reference geographic locations are disparate from the geographic location of interest.

8. The method of claim 1, wherein the plurality of reference geographic locations influence the geospatial measure in the geographic location of interest.

9. A system for predicting a geospatial measure in a geographic location of interest, the system including one or more processors and memory storing instructions that, in response to execution of the instructions, cause the one or more processors to:
   extract one or more features from a plurality of reference geographic locations;
   encode a spatial heterogeneity embedding to quantify uniqueness of the features with respect to the plurality of reference geographic locations;
   encode a spatial dependence embedding to quantify similarities of the features with respect to the plurality of reference geographic locations;
   encode the extracted features, the spatial heterogeneity embedding, and the spatial dependence embedding into a joint embedding;
   apply a sequence encoder to the joint embedding to generate encoded data indicative of a predicted geospatial measure; and
   apply the encoded data indicative of the predicted geospatial measure as input across a decoder to generate the predicted geospatial measure, wherein the decoder and the sequence encoder are trained together by minimizing a loss function.

10. The system of claim 9, wherein the sequence encoder includes a long short-term memory (LSTM) network.

11. The system of claim 9, wherein the one or more features extracted from each of the plurality of reference geographic locations include time series sea surface temperatures.

12. The system of claim 9, wherein each of the plurality of reference geographic locations is related to the geographic location of interest via a teleconnection.

13. The system of claim 9, further including instructions to apply a trained version of the sequence encoder to historical climate data associated with the geographic location of interest.

14. The system of claim 9, further including instructions to encode the joint embedding by applying a bottleneck feed-forward network to the extracted features.

15. The system of claim 9, wherein the plurality of reference geographic locations are disparate from the geographic location of interest.

16. The system of claim 9, wherein the plurality of reference geographic locations influence the geospatial measure in the geographic location of interest.

17. At least one non-transitory computer-readable medium for predicting a geospatial measure in a geographic location of interest the medium comprising instructions that, in response to execution of the instructions by one or more processors, cause the one or more processors to:

extract one or more features from a plurality of reference geographic locations;
encode a spatial heterogeneity embedding to quantify uniqueness of the features with respect to the plurality of reference geographic locations;
encode a spatial dependence embedding to quantify similarities of the features with respect to the plurality of reference geographic locations;
encode the extracted features, the spatial heterogeneity embedding, and the spatial dependence embedding into a joint embedding
apply a sequence encoder to the joint embedding to generate encoded data indicative of a predicted geospatial measure; and
apply the encoded data indicative of the predicted geospatial measure as input across a decoder to generate the predicted geospatial measure, wherein the decoder and the sequence encoder are trained together by minimizing a loss function.

18. The at least one non-transitory computer-readable medium of claim 17, wherein the sequence encoder includes a long short-term memory (LSTM) network.

19. The at least one non-transitory computer-readable medium of claim 17, wherein the one or more features extracted from each of the plurality of reference geographic locations include time series sea surface temperatures.

20. The at least one non-transitory computer-readable medium of claim 17, further including instructions to encode the joint embedding by applying a bottleneck feed-forward network to the extracted features.

* * * * *